United States Patent
Contreras et al.

(10) Patent No.: US 9,570,096 B2
(45) Date of Patent: Feb. 14, 2017

(54) READ PATH COMPENSATION FOR SNR AND SIGNAL TRANSFER

(75) Inventors: John Contreras, Palo Alto, CA (US); Tatemi Ido, Hachioji (JP); Nobumasa Nishiyama, Yokohama (JP); Xinzhi Xing, San Jose, CA (US)

(73) Assignee: HGST NETHERLANDS B.V., Amsterdam (NL)

( * ) Notice: Subject to any disclaimer, the term of this patent is extended or adjusted under 35 U.S.C. 154(b) by 1351 days.

(21) Appl. No.: 12/851,827

(22) Filed: Aug. 6, 2010

(65) Prior Publication Data

US 2012/0033319 A1 Feb. 9, 2012

(51) Int. Cl.
*G11B 5/09* (2006.01)
*G11B 5/02* (2006.01)
*G11B 20/10* (2006.01)

(52) U.S. Cl.
CPC ............ *G11B 5/02* (2013.01); *G11B 20/10018* (2013.01); *G11B 2220/2516* (2013.01)

(58) Field of Classification Search
None
See application file for complete search history.

(56) References Cited

U.S. PATENT DOCUMENTS

| | | | |
|---|---|---|---|
| 5,608,591 A * | 3/1997 | Klaassen | ................ 360/245.9 |
| 6,166,872 A | 12/2000 | Uno et al. | |
| 6,265,905 B1 | 7/2001 | Jove et al. | |
| 6,549,357 B1 | 4/2003 | Iroaga | |
| 6,602,212 B1 | 8/2003 | Ahn | |
| 6,657,827 B1 * | 12/2003 | Fukuda et al. | ................ 360/323 |
| 6,667,842 B2 | 12/2003 | Comeau et al. | |
| 6,822,817 B2 | 11/2004 | Chung et al. | |
| 7,054,085 B2 | 5/2006 | Lin et al. | |
| 7,061,321 B1 | 6/2006 | Stein et al. | |
| 7,082,004 B2 | 7/2006 | Kajiyama et al. | |
| 7,417,818 B2 | 8/2008 | Yuuki et al. | |
| 7,460,338 B2 | 12/2008 | Okabe | |
| 7,558,014 B1 | 7/2009 | Voo et al. | |
| 2006/0077584 A1 | 4/2006 | Nainar | |
| 2010/0157457 A1 | 6/2010 | Contreras et al. | |

FOREIGN PATENT DOCUMENTS

| | | |
|---|---|---|
| JP | 9185803 | 7/1997 |
| JP | 2008047246 | 2/2008 |

OTHER PUBLICATIONS

Jason C. Jury et al., "Designing Disk Drive Interconnects to Obtain a Desired Transmitted Write Current Waveform", IEEE Transactions on Magnetics, vol. 38, No. 1, Jan. 2002, pp. 55-60.

(Continued)

*Primary Examiner* — Regina N Holder
(74) *Attorney, Agent, or Firm* — Patterson & Sheridan, LLP (57) ABSTRACT

A method and apparatus is provided for extending a read bandwidth and increasing a high-frequency signal-to-noise ratio (SNR) of a front-end of a read path of a hard disk drive (HDD) by introducing a high impedance section at the front-end of the read path. The high impedance section may mitigate capacitive effects found at the front-end of the read path, thereby improving signal transfer by extending the read bandwidth.

20 Claims, 5 Drawing Sheets

(56) References Cited

OTHER PUBLICATIONS

Klaas B. Klaassen et al., "Read/Write Electronics Front-End Systems for Hard Disk Drives", IEEE Transactions on Magnetics, vol. 40, No. 1, Jan. 2004, pp. 263-268.

John Contreras et al., "Magnetic Recording Disk Drive with Integrated Lead Suspension Having Multiple Segments for Optimal Characteristic Impedance", U.S. Appl. No. 12/635,606, filed Dec. 10, 2009.

Michael Alex et al., "Magnetic Recording Disk Drive with Write Driver to Write Head Transmission Line Having Non-Uniform Sections for Optimal Write Current Pulse Overshoot", U.S. Appl. No. 12/641,362, filed Dec. 18, 2009.

* cited by examiner

READ PATH COMPENSATION FOR SNR AND SIGNAL TRANSFER

BACKGROUND OF THE INVENTION

Field of the Invention

Embodiments of the present invention generally relate to a read path of a hard disk drive (HDD), and more particularly to extending a read bandwidth and increasing a high-frequency signal-to-noise ratio (SNR) of a front-end of the read path.

Description of the Related Art

In magnetic recording HDDs, the read/write head is formed on an air-bearing slider that rides on a thin film of air above the rotating disk. A mechanical suspension comprised of a flexure with a gimbal at its end connects the slider to an actuator arm of the disk drive. The slider is attached to the gimbal, which allows for slight movement on the air bearing as the disk rotates. A transmission line provides electrical connection from the read/write circuitry, typically in a read preamplifier/write driver module or chip, through a short flex cable and suspension to the read and write elements on the slider.

A suspension that integrates the mechanical connection with the electrical connection is called an integrated lead suspension (ILS) that is connected between the flex cable and connection pads on the slider. A typical ILS is a generally flexible laminate of a conductive metal substrate like stainless steel, an insulating dielectric layer like polyimide, and electrically conductive copper lines or traces patterned on the dielectric layer. The transmission line for the signals from the read head to the read preamplifier thus comprises electrically conductive traces on the flex cable and the ILS.

The read/write head may comprise two devices: a read transducer and a write element. In newer HDDs, read transducers may continue to increase in impedance value as the transducer size may decrease as required by higher areal density. This impedance increase may result in two major drawbacks. First, high sensor impedance with accompanying parasitic capacitance may reduce the read bandwidth. As data rates continue to increase, the bandwidth must also continue to increase. Traditionally, the write path was the bottleneck to achieving higher data rates, but with higher read transducer impedance values, the read transmission path must improve to achieve higher data rates. Known solutions include lowering the impedance of the read path (i.e., higher cost) and/or lowering the input impedance of the amplifier.

As a second drawback, higher transducer impedance may also give more severe impedance mismatch between the transducer and the interconnect, which may result in a higher electronic noise contribution at high frequencies, therefore, an SNR degradation. The conventional solution requires higher cost and low noise electronics, or higher cost interconnects to achieve higher data rates for the read path.

SUMMARY OF THE INVENTION

Embodiments of the present invention generally provide for extending a read bandwidth and increasing a high-frequency signal-to-noise ratio (SNR) of a front-end of a read path.

One embodiment of the present invention provides a read path for a hard disk drive (HDD). The read path generally includes a read head, read circuitry, a transmission line connecting the read head and the read circuitry, and an impedance section associated with extending a read bandwidth and increasing a signal-to-noise ratio (SNR) of a front-end of the read path, wherein the front-end comprises at least the read head.

Another embodiment of the present invention provides a hard disk drive (HDD) The HDD generally includes a magnetic storage medium, and a read path configured to read data from the medium, the read path comprising a read head, read circuitry, a transmission line connecting the read head and the read circuitry, and an impedance section associated with extending a read bandwidth and increasing a signal-to-noise ratio (SNR) of a front-end of the read path, wherein the front-end comprises at least the read head.

Another embodiment of the present invention provides a read path for a hard disk drive (HDD). The read path generally includes a read head, read circuitry, a transmission line connecting the read head and the read circuitry, and an impedance section disposed in a front-end of the read path for mitigating effects of a parasitic capacitance of the read head, wherein the front-end comprises at least the read head.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments of the present invention described herein may help extend a read bandwidth and increase a high-frequency signal-to-noise ratio (SNR) of a front-end of a read path in a hard disk drive (HDD). As the read transducer in newer HDDs continues to increase in impedance value, there may be a reduction in the read bandwidth. In addition, the increase in impedance value may also give more severe impedance mismatch between the read transducer and the interconnect, which may result in a higher electronic noise contribution at high frequencies, therefore, an SNR degradation. Embodiments of the present invention overcome or mitigate these limitations by providing compensation along the read path.

Figure 1:
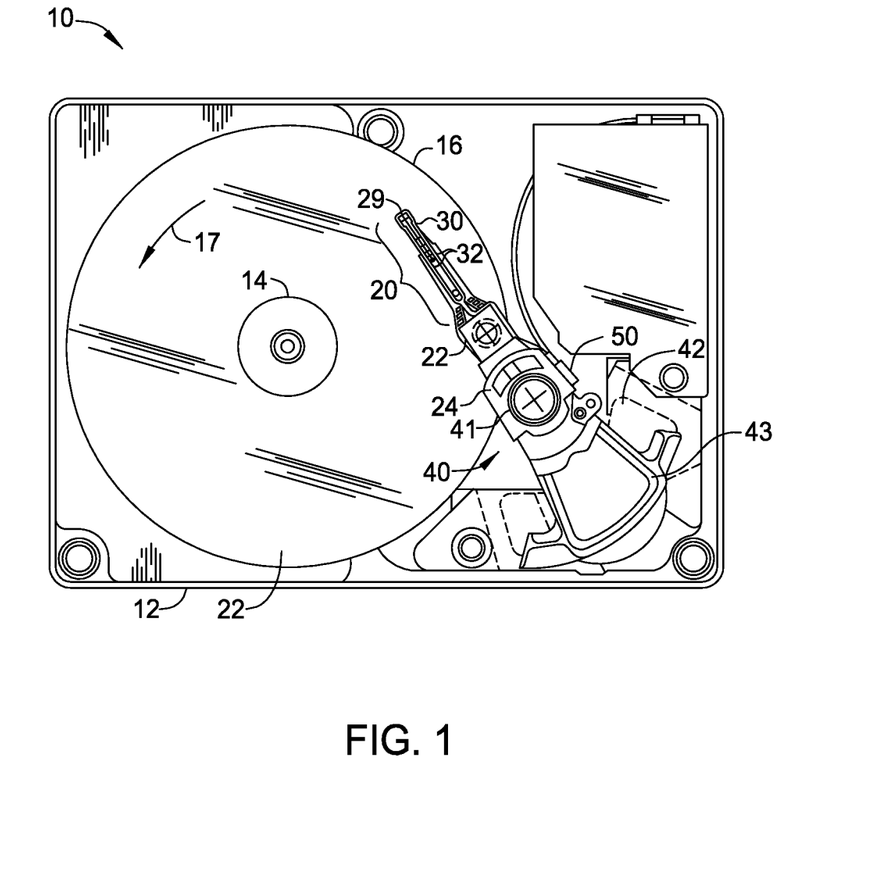
FIG. 1 shows a top plan view of a head/disk assembly (HDA) of a hard disk drive (HDD) and illustrates an integrated lead suspension (ILS) having an electrical trace interconnect array, according to embodiments of the invention.

FIG. 1 shows a top plan view of a head/disk assembly (HDA) of a hard disk drive (HDD) 10, according to embodiments of the invention. The HDD 10 may have at least one load beam assembly 20 comprising an integrated lead suspension (ILS) 30 with an array 32 of electrically conductive interconnect traces or lines that may connect to a read/write head 29. The load beam assemblies 20 may be attached to rigid arms 22 connected to an E-block 24. The HDD 10 may include a rigid base 12 supporting a spindle 14 that may support a stack of disks, comprising a top disk 16. The spindle 14 may be rotated by a spindle motor (not shown) for rotating the disks in the direction shown by curved arrow 17.

HDD 10 may also comprise a rotary actuator assembly 40 rotationally mounted to the base 12 at a pivot point 41. The actuator assembly 40 may be a voice coil motor (VCM) actuator that comprises a magnet assembly 42 fixed to base 12 and a voice coil 43. When energized by control circuitry (not shown) the voice coil 43 may move and thereby rotate E-block 24 with attached arms 22 and load beam assemblies 20 to position the heads 29 to the data tracks on the disks. The trace interconnect array 32 may connect at one end to the read/write head 29 and at its other end through a short flex cable to read/write circuitry contained in an electrical module or chip 50, which may be secured to a side of the E-block 24. The chip 50 may comprise a read preamplifier/write driver circuit.

Figure 2:
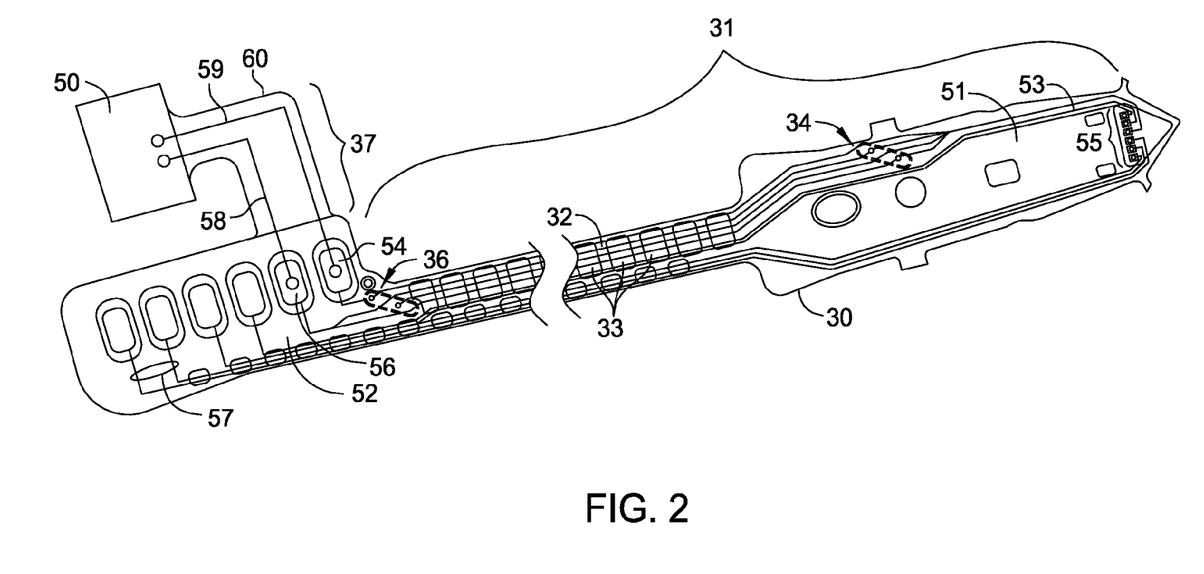
FIG. 2 shows a plan view of the ILS and read/write chip showing the transmission line between the read/write chip and the gimbal portion of the ILS, according to embodiments of the invention.

FIG. 2 shows a plan view of the ILS 30 and chip 50 showing the transmission line that connects the chip 50 with the read/write head 29, according to embodiments of the invention. The ILS 30 may comprise a transmission line 31 between a gimbal portion 51 and a flex cable pad portion 52. The ILS 30 may be a laminate comprised of three layers: a conductive substrate, an insulating dielectric layer, a conductive layer for the electrical traces or lines, and an optional insulating dielectric cover layer.

The conductive substrate may be typically formed of metal like stainless steel, and the insulating dielectric layer may be formed of a dielectric material like polyimide. The conductive substrate is typically about 18 microns thick and the insulating dielectric layer is typically about 10 microns thick. The optional insulating dielectric cover layer is also typically formed of polyimide to a thickness of about 15 microns. The transmission line 31 may also comprise a plurality of windows or gaps 33 in the conductive substrate of the laminate. In the gaps, there may be no stainless steel below the insulating dielectric layer. The gaps 33 may reduce the signal losses caused by the conductive substrate.

The gimbal portion 51 may support a slider (not shown) that may contain the read/write heads 29 (FIG. 1) and may have conductive traces 53 leading to pads 55 for electrical connection to pads on the slider. The ILS 30 may have an electrical connection end 34 that may be connected to traces 53 on gimbal portion 51. The flex cable pad portion 52 may have a plurality of electrical connection pads (e.g., pads 54, 56), that may be electrically connected to chip 50 via a flex cable 60.

The flex cable 60 may connect the chip 50 mounted on the side of the E-block 24 (FIG. 1) to pads 54, 56 on the ILS 30. Only the −W and +W electrical leads 58, 59, respectively, are depicted to simplify the illustration in FIG. 2. The ILS 30 may have an electrical connection end 36 that may be connected to pads 54, 56 on flex cable pad portion 52. A plurality of interleaved electrically conductive traces or lines 32 may extend generally parallel to one another along the body of the ILS 30 between the flex cable pad portion 52 and the gimbal portion 51. The lines 32 may form part of the transmission line 31 of the ILS 30 from the write driver in chip 50 with the write head on the slider attached to gimbal end 51. The other part of the transmission line from the write driver in chip 50 to the write head may be the transmission line 37 on flex cable 60, specifically lines 58, 59. The ILS 30 may also comprise conductive traces or lines 57 that connect the read preamplifier in chip 50 with the read head on the slider attached to gimbal end 51.

Figure 3:
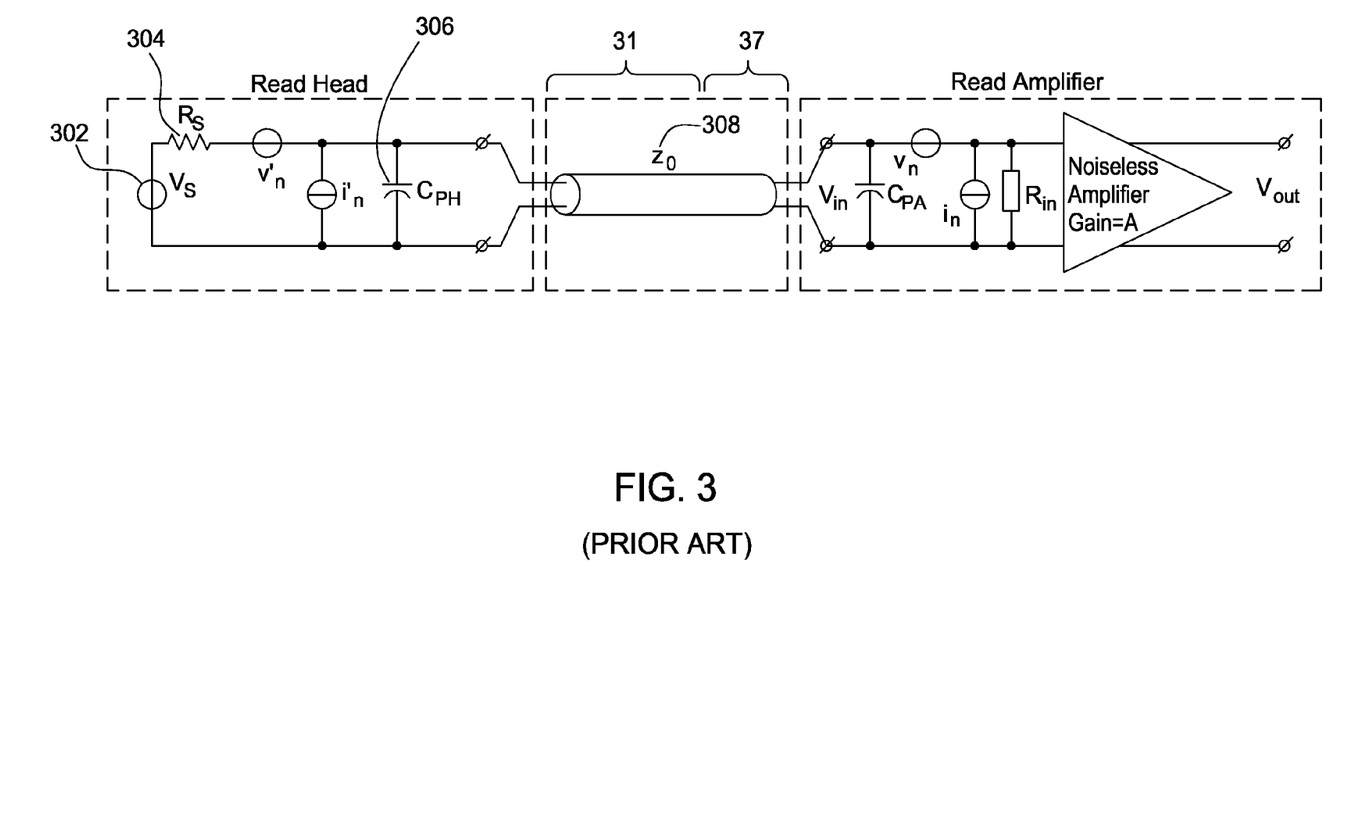
FIG. 3 shows a prior art schematic illustration of a read path comprising a transmission line with characteristic impedance $Z_0$ between the read head and the read amplifier.

FIG. 3 shows a schematic illustration of a read path comprising an interconnect between the read head and the read amplifier. The read head may comprise any suitable transducer. In an HDD, the read transducer may be the source termination for the suspension interconnect, and the input of the read amplifier may be the receiver termination for the suspension interconnect. The read head may supply a signal ($V_S$) 302 and may have a resistance ($R_S$) 304. The read head may be connected to the transmission line 31 of the ILS 30, and the read amplifier may be connected to the transmission line 37 of flex cable 60 (FIG. 2).

The disk drive industry has been progressively decreasing the size and mass of head slider structures in order to reduce the moving mass of the actuator assembly and to permit closer operation of the read transducer to the disk surface, the former giving rise to improved seek performance and the latter giving rise to improved transducer efficiency that can then be traded for higher areal density. However, the read transducer may increase in series impedance value (i.e., resistance $R_S$ 304) as the transducer size continues to decrease. Traditionally, $R_S$ 304 ranged from 60 Ω to 100Ω, however, in newer devices, $R_S$ 304 may range from 100 Ω to 10,000 Ω for some embodiments. This impedance increase may result in two major drawbacks. First, high sensor impedance with accompanying parasitic capacitance may reduce the read bandwidth.

For some embodiments, the read bandwidth may be reduced further by an added parallel capacitance $C_{PH}$ 306, which may be larger in newer designs (e.g., up to 2 pF). The transmission line may have characteristic impedance ($Z_O$) 308 to match the amplifier (e.g., 70Ω), but with the increase in series impedance value and added parallel capacitance, the data rate capability may be limited. However, as data rates continue to increase, the bandwidth must also continue to increase. As a second drawback, higher sensor impedance may also give more severe impedance mismatch between the read head and the interconnect, which may result in a higher electronic noise contribution at high frequencies, therefore, a signal-to-noise ratio (SNR) degradation.

Embodiments of the invention may help extend the read bandwidth and increase the high-frequency SNR of the front-end of the read path by introducing a high impedance launch at the front-end of the read path. The high impedance section may mitigate the capacitive effects at the read sensor.

Figure 4:
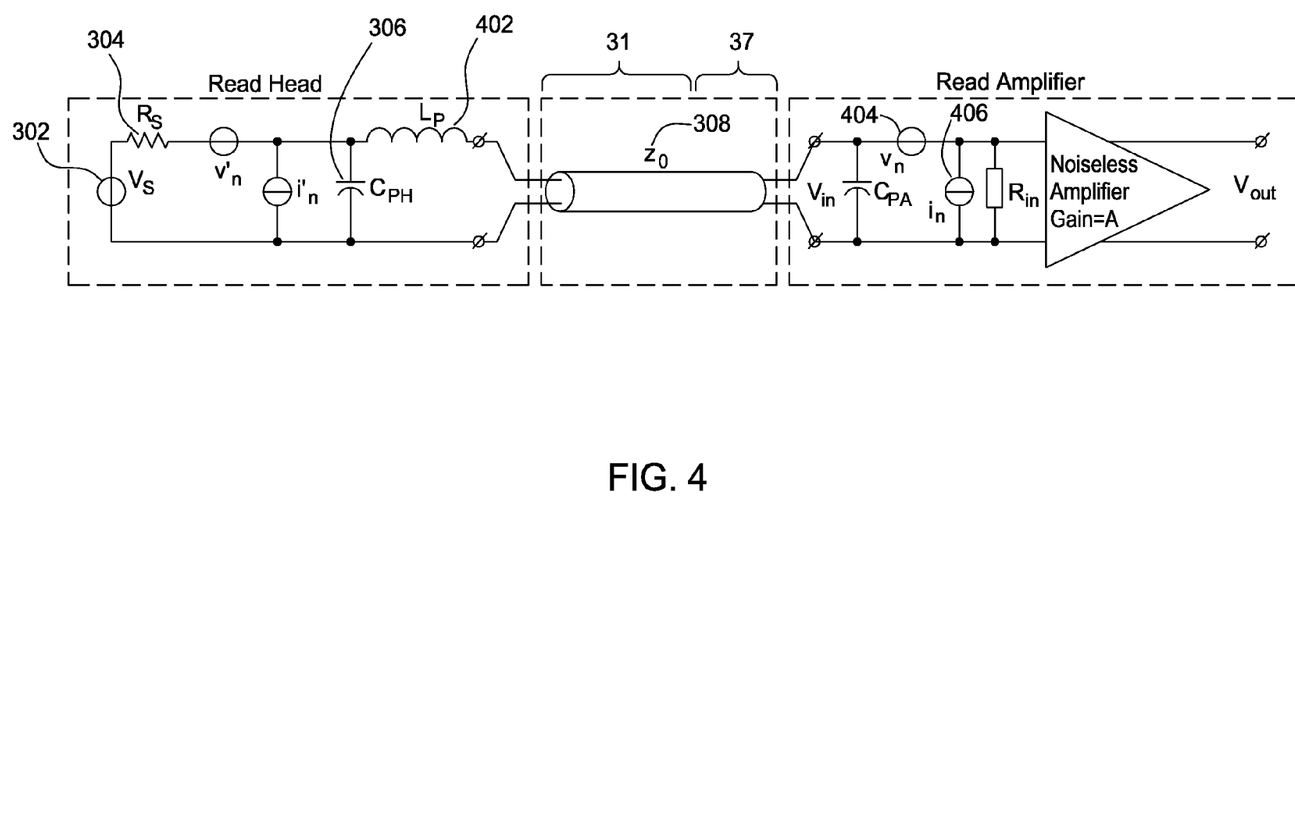
FIG. 4 shows a schematic illustration of a read path comprising a high impedance section at the front-end of the read path, according to embodiments of the invention.

FIG. 4 shows a schematic illustration of a read path comprising a high impedance section 402, such as an inductor ($L_P$), at the front-end of the read path, according to embodiments of the invention. It should be understood that the high impedance section 402 of the present invention is shown as inductor $L_P$ in an exemplary embodiment, but that the invention is equally applicable for other elements and devices providing a high impedance for extending the read bandwidth and increasing the high-frequency SNR of the front-end of the read path. For some embodiments, the high impedance section 402 may be integrated with the read head, as illustrated in FIG. 4. For some embodiments, the high impedance section 402 may be a high impedance transmission line section along the transmission line 31 in close proximity to the read head. For some embodiments, the impedance section may be constructed out of the trace(s) of the transmission line. The impedance section 402 may have an inductance in a range from about 4 nH to 10 nH, for example.

The high impedance section 402 at the source may help with noise matching with the receiver (i.e., the read amplifier). Noise from the input of the read amplifier may be represented as a voltage noise source ($v_n$) 404 and a current noise source ($i_n$) 406 (i.e., input referred noise). The voltage and current noise sources 404, 406 may interact with the transmission line. Because the source (i.e., the read head) may not be matched with the transmission line (i.e., $R_S \gg Z_0$) there may be noise peaking due to transmission line resonance effects. However, the high impedance section 402 may suppress the peaking effect with the noise and reduce high frequency noise effects. In other words, the high impedance section 402 may increase the high-frequency SNR due to better noise matching with the noise sources 404, 406 of the read amplifier.

The high impedance section 402 may help extend the read bandwidth to mitigate the effects of the additional capacitance 306, which may be found in newer devices. For some embodiments, compensation elements may be added along the transmission line for impedance matching at the receiver (i.e., the read amplifier). For example, structures to mitigate the capacitive effects at the read head may be provided along the transmission line, thereby extending the read bandwidth. For example, a capacitor-inductor-capacitor (CLC) network may be provided to improve signal transfer by extending the bandwidth, wherein the CLC network may comprise the additional capacitance 306 found in newer devices, the high impedance section 402, such as an inductor, and the structures that may be provided along the transmission line.

Figure 5:
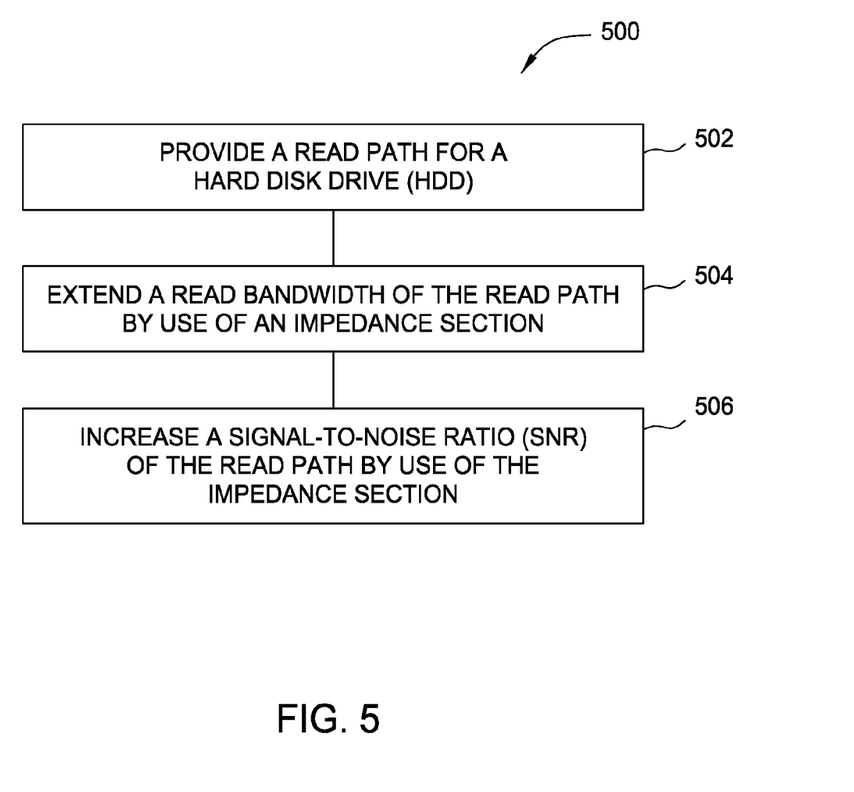
FIG. 5 is a flow chart of a method of extending a read bandwidth and increasing a signal-to-noise ratio (SNR) of a read path by use of an impedance section, according to embodiments of the invention.

FIG. 5 is a flow chart of a method of extending a read bandwidth and increasing a signal-to-noise ratio (SNR) of a read path by use of an impedance section, according to embodiments of the invention. The operations begin at 502 by providing the read path for an HDD. Operations continue at 504, by extending the read bandwidth of the read path by use of an impedance section. For some embodiments, the impedance section may be integrated with the read head, as illustrated by $L_P$ 402 in FIG. 4. For some embodiments, the impedance section may be a high impedance transmission line section along the transmission line in close proximity to the read head. At 506, the SNR may be increased by use of the impedance section.

While the foregoing is directed to embodiments of the present invention, other and further embodiments of the invention may be devised without departing from the basic scope thereof, and the scope thereof is determined by the claims that follow.

The invention claimed is:

1. A read path for a hard disk drive (HDD), comprising:
a read head;
read circuitry;
a transmission line connecting the read head and the read circuitry, wherein the transmission line consists of one or more traces; and
an impedance section associated with extending a read bandwidth and increasing a signal-to-noise ratio (SNR) of a front-end of the read path, wherein the front-end comprises at least the read head,
wherein the impedance section is part of at least one of the read head and the transmission line.

2. The read path of claim 1, wherein at least one trace of the transmission line performs impedance matching at the read circuitry.

3. The read path of claim 2, wherein the at least one trace mitigates capacitive effects at the read head and extends the read bandwidth.

4. The read path of claim 1, wherein the impedance section is part of the read head.

5. The read path of claim 1, wherein the impedance section comprises a section of the transmission line in close proximity to the read head.

6. The read path of claim 1, wherein the impedance section comprises an inductor.

7. The read path of claim 1, wherein the read circuitry comprises a preamplifier.

8. A hard disk drive (HDD) comprising:
a magnetic storage medium; and
a read path configured to read data from the medium, the read path comprising:
a read head;
read circuitry;
a transmission line connecting the read head and the read circuitry, wherein the transmission line consists of one or more traces; and
an impedance section associated with extending a read bandwidth and increasing a signal-to-noise ratio (SNR) of a front-end of the read path, wherein the front-end comprises at least the read head,
wherein the impedance section is part of at least one of the read head and the transmission line.

9. The HDD of claim 8, wherein at least one trace of the transmission line performs impedance matching at the read circuitry.

10. The HDD of claim 9, wherein the at least one trace mitigates capacitive effects at the read head and extends the read bandwidth.

11. The HDD of claim 8, wherein the impedance section is part of the read head.

12. The HDD of claim 8, wherein the impedance section comprises a section of the transmission line in close proximity to the read head.

13. The HDD of claim 8, wherein the impedance section comprises an inductor.

14. A read path for a hard disk drive (HDD), comprising:
a read head;
read circuitry;
a transmission line connecting the read head and the read circuitry; and an impedance section disposed in a front-end of the read path for mitigating effects of a parasitic capacitance of the read head, wherein the front-end comprises at least the read head.

15. The read path of claim 14, wherein the impedance section is part of the read head.

16. The read path of claim 14, wherein the impedance section comprises a section of the transmission line in close proximity to the read head.

17. The read path of claim 16, wherein the impedance section is constructed from a trace of the transmission line.

18. The read path of claim 14, wherein the impedance section comprises an inductor.

19. The read path of claim 18, wherein the inductor has an inductance in a range from 4 nH to 10 nH.

20. The read path of claim 14, wherein the read circuitry comprises a preamplifier.

\* \* \* \* \*